Feb. 28, 1928.
C. D. LYON
1,661,125
SANDING DEVICE FOR AUTOMOBILES
Filed June 5, 1925
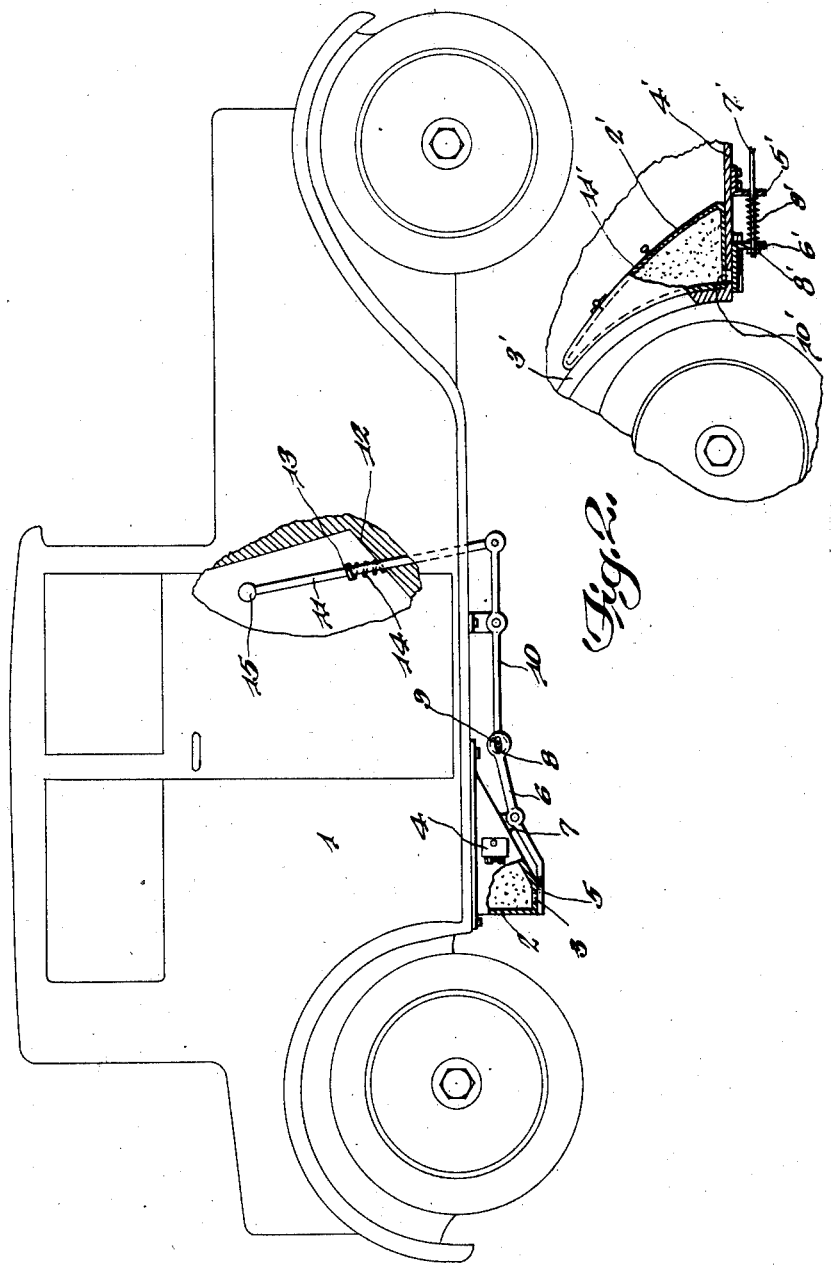
Charles D. Lyon
INVENTOR
BY Victor J. Evans
ATTORNEY Patented Feb. 28, 1928.

1,661,125

UNITED STATES PATENT OFFICE.

CHARLES D. LYON, OF OAK PARK, ILLINOIS.

SANDING DEVICE FOR AUTOMOBILES.

Application filed June 5, 1925. Serial No. 35,186.

This invention relates to new and useful improvements in sanding devices and more particularly to a device of this character which is especially adapted for use on motor vehicles. The main object of my invention is the provision of means whereby sand may be distributed on wet and slippery surfaces in order to prevent the driving wheels of a motor vehicle from skidding on such surfaces.

Another object of my invention is the provision of a sanding device adapted for use on a motor vehicle and operated from the driver's seat whereby sand may be readily distributed over wet or slippery surfaces and directed in front of the driving wheels of the vehicle so as to prevent the wheels from sliding or skidding.

With the above and other objects in view, my invention consists in the novel features of construction and the combination and arrangement of parts to be hereinafter more fully described, pointed out in the claim and shown in the accompanying drawings, in which:

Fig. 1 is a side elevation of a motor vehicle illustrating my improved device applied thereto, and Fig. 2 is a detailed elevation of a modified form, parts thereof being broken away and illustrated in section.

Referring more particularly to the drawings in which I have illustrated my device as applied to a motor vehicle, the numeral 1 indicates the vehicle having a receptacle 2 attached to the lower side thereof and which is provided with the outlet 3 and a door 4 whereby the supply of sand may be replenished in the receptacle when required.
The opening 3 is normally closed by means of a stopper plate 5 formed on the rear end of a pivoted arm 6 which is supported upon a bracket 7 and the other end of the arm 6 is provided with a slot 8 receiving a pin 9 carried by one end of a pivoted link 10.

The forward end of the link 10 is pivotally connected to the lower end of the operating rod 11. This operating rod 11 is slidably mounted in an opening in the foot board 12 of the vehicle and carries a collar 13 adapted to compress a spring 14 upon downward movement of the rod whereby the tension of the spring will raise the rod 11 to its normal inoperative position as shown in the drawing.

The upper end of the rod 11 is provided with a hand portion 15 adapted to be grasped by the operator for moving the rod 11 downwardly against the tension of the spring 14, this movement rocking the arm 6 upon its pivot and moving the stopper plate 5 away from the opening 3 to permit the contents of the receptacle 2 to pass through the opening and particular attention is directed to the fact that when the stopper plate 5 is moved to an open position it will provide suitable guide members for the sand passing out through the opening 3 so as to direct the sand in the path of the driver wheels of the vehicle so as to assure the positive engagement of the driving wheels with the sanded surfaces.

It will be apparent from the foregoing that I have provided a simple and inexpensive device which may be quickly and readily attached to motor vehicles and of various makes of motor vehicles which will prove very efficient in supplying sand or similar material to wet and slippery surfaces over which the vehicle is passing so as to prevent accidental skidding and sliding of the driving wheel.

In Fig. 2 I have illustrated a slightly modified form of the invention wherein the receptacle 2' is fitted against the rear fender 3' and formed tapering as well as curved so that the same may be rested snugly against the outer surface of the fender. The bottom of the receptacle 2' rests upon the foot board 4' and may be secured thereto in any suitable manner.

Arranged beneath the foot board 4 are the spaced angular plates 5' and 6', the vertically disposed flange of the plate 5' forming a guide for the rod 7' an end of which extends through the vertical flange of the plate 6' and has a nut 8' threaded thereon whereby movement of the rod 7' in one direction will move the plate 6' toward the other plate against the tension of the spring 9' which is mounted upon the rod and disposed between the two plates.

The horizontal portion of the plate 6' normally closes the opening 10' which leads from the interior of the receptacle 2' whereby when the plate 6' is moved toward the plate 5' the opening 10 will be uncovered to permit the contents of the receptacle 2' to pass through the same. The receptacle 2' is provided with an opening for filling the same and this opening is normally closed by means of a hinged door 11'.

The rod 7' may be connected to any desired movable part of the vehicle but it is preferred to have the same attached directly to the emergency brake lever so that the same may be readily actuated for opening and closing the openings 10.

While I have shown and described the preferred form of my invention, it will be obvious that various changes in the details of construction and in the proportions may be resorted to for successfully carrying my invention into practice without sacrificing any of the novel features of construction or departing from the scope of the appended claim.

Having thus described my invention, what I claim is:

A device of the character described including a receptacle having a discharge opening, a pivoted arm mounted adjacent said discharge opening, a stopper plate carried by one end of said arm, the other end of said arm having a slot therein, a pivotally mounted link, a pin carried by the link and movable in said slot, a reciprocating rod having pivotal connection with the link whereby movement of the rod in one direction will move the stopper plate away from said discharge opening and spring means for moving the rod in the opposite direction for closing said opening.

In testimony whereof I affix my signature.

CHARLES D. LYON.